United States Patent [19]

Ueda et al.

[11] 4,264,159
[45] Apr. 28, 1981

[54] CONTROL SYSTEM FOR SINGLE LENS REFLEX CAMERA

[75] Inventors: Hiroshi Ueda, Nara; Seiji Yamada, Sakai, both of Japan

[73] Assignee: Minolta Camera Kabushiki Kaisha, Osaka, Japan

[21] Appl. No.: 940,358

[22] Filed: Sep. 7, 1978

[30] Foreign Application Priority Data

Sep. 14, 1977 [JP] Japan .................................. 52/111029

[51] Int. Cl.³ .......................... G03B 7/087; G03B 9/00; G03B 19/12
[52] U.S. Cl. ........................................ 354/24; 354/31; 354/38; 354/152; 354/228
[58] Field of Search ..................... 354/24, 31, 36, 38, 354/43, 152, 234, 235, 266, 267, 154, 156, 44, 271, 228, 229, 231, 232

[56] References Cited

U.S. PATENT DOCUMENTS

| | | | |
|---|---|---|---|
| 3,777,637 | 12/1973 | Kuramoto et al. | 354/41 X |
| 3,922,693 | 11/1975 | Matsui | 354/234 X |
| 3,972,055 | 7/1976 | Matsuda et al. | 354/24 |
| 4,089,014 | 5/1978 | Ueda et al. | 354/38 |
| 4,099,192 | 7/1978 | Aizawa et al. | 354/234 |
| 4,142,787 | 3/1979 | Ueda et al. | 354/38 |
| 4,162,839 | 5/1979 | Mashimo et al. | 354/38 X |

Primary Examiner—L. T. Hix
Assistant Examiner—William B. Perkey
Attorney, Agent, or Firm—Watson, Cole, Grindle & Watson

[57] ABSTRACT

An automatic exposure control system for a single lens reflex camera, of the type wherein diaphragm blades defining a diaphragm aperture are driven in response to a camera release operation to change the aperture in accordance with the light from an object to be photographed (object light) as measured by a light measuring device which has a photoelectric element adapted to receive the object light through changing diaphragm aperture as well as through the camera objective. When the output of the light measuring device reaches or goes beyond a given level, a control device generates an output signal to actuate a first electromagnetic device which stops the operation of the diaphragm blades so that a diaphragm aperture suitable for the object brightness is determined as a function of a set shutter speed and a set film sensitivity. The output signal also serves to actuate a second electromagnetic device which actuates a reflex mirror immediately after the diaphragm aperture determination, with a shutter mechanism being actuated subsequently for film exposure. The shutter may be controlled in accordance with the output of the light measuring circuit which measures the scene brightness through the determined diaphragm aperture.

6 Claims, 3 Drawing Figures

CONTROL SYSTEM FOR SINGLE LENS REFLEX CAMERA

BACKGROUND OF THE INVENTION

1. Field of the Invention

The present invention relates to an automatic exposure control system for a single lens reflex camera and more particularly relates to an exposure control system of the type wherein light from an object to be photographed (an object light) is measured by a light measuring device through a camera objective and a diaphragm aperture which is being varied due to driving of the diaphragm blades from a full open position to an advanced stopped-down position, or vice versa, until the blades are stopped when the output of the light measuring device reaches a given level with respect to a set shutter speed and a film sensitivity, whereby a suitable diaphragm aperture is set or determined automatically.

2. Description of the Prior Art

Exposure control systems of the above mentioned type have been proposed. In the known systems, however, the reflex mirror is actuated to move from its viewing position to its photographic position, by a member of the diaphragm driving mechanism when the member approaches its terminal position after its further travel subsequent to the determination of the diaphragm aperture, or by a mechanical member responsive to the diaphragm blade stopping operation.

In the former case, i.e. mirror actuation by a member of a diaphragm drive mechanism, some delay always occurs between the determination of a diaphragm aperture and the actuation of the mirror, while in the latter case, i.e. the actuation of the mirror by a mechanical responsive member, the mechanical linkage between the diaphragm stopping member and the mirror actuating member is complex and causes some mechanical delay during the transmission of the movement, because the stroke of the diaphragm stopping member, which may have the form of, for example, a lever with an armature controlled by an electromagnet, must be small to ensure exactness of the diaphragm aperture determination and such a movement of the small stroke must be transmitted. This will be easily understood from the consideration that if the stroke is large then the diaphragm blades move a little further during the travel of the stopping member after the actuation of the electromagnet. In other words, the stopping member must have a short stroke to stop the diaphragm blades immediately after a stop signal is generated to actuate the electromagnet.

SUMMARY OF THE INVENTION

An object of the present invention is to provide an improved automatic exposure control system which automatically controls the diaphragm aperture in accordance with an object light measurement through the aperture of the diaphragm being driven.

Another object of the present invention is to provide an automatic exposure control system for a single lens reflex camera, as described above, wherein the reflex mirror is actuated immediately after the diaphragm determination but without complex linkage between a diaphragm stopping member and a mirror actuating member.

A further object of the present invention is to provide an automatic exposure control system for a single lens reflex camera wherein diaphragm blades are actuated in response to a camera release operation and driven until a diaphragm aperture is determined in accordance with the light measurement through the changing aperture of the diaphragm, and immediately after the diaphragm aperture determination, retirement of the reflex mirror from its viewing to its photographic position occurs, followed by the actuation of the shutter, whereby minimum time is required between the release operation and the shutter actuation.

Still another object of the present invention is to provide an improved automatic exposure control system which automatically determines a diaphragm aperture in accordance with the object light measurement through the diaphragm aperture being varied, and which controls shutter speed in accordance with the light measurement through the determined diaphragm aperture, the shutter being actuated subsequent to the mirror movement from a viewing to a photographing position.

The last mentioned exposure control made has advantages in that error or deviation from an exact value upon diaphragm aperture determination, can be compensated by the shutter speed and that a proper or appropriate exposure can be obtained even when an object brightness, in association with a set shutter speed and a set film speed, requires a diaphragm aperture unavailable with the diaphragm mechanism at use, by the shift of shutter speed from the set value. For such automatic shutter and diaphragm control by through-the-aperture light measurement, two types of light measuring systems have been proposed. The first one is a storage type (for example as shown in U.S. Pat. No. 3,972,055) wherein the shutter speed is controlled in accordance with a signal which is representative of the intensity of light received by a photoelectric element of the light measuring circuit when the diaphragm aperture is determined and which has been stored in a storage device subsequent to the diaphragm aperture determination. In this case a single photoelectric element may be commonly used for both diaphragm and shutter controls. The second type is a focal plane light reflection type wherein the shutter speed is controlled in accordance with an output of a photoelectric element receiving the light coming from an object to be, or actually being photographed, traversing the camera objective and the automatically determined diaphragm aperture, and reflected by a focal plane shutter member and/or the film surface. That is, the light is reflected only by the focal plane shutter member when the film is fully covered by the shutter member, partially by the shutter member and partially by the film surface as the film surface is being uncovered, and only by the film surface when the latter is fully uncovered and exposed to the object light. The focal plane shutter member is a leading or front shutter curtain or a set of shutter blades or thin metal plate as the case may be. However the shutter member is the type disposed just in front of the film surface and having a light reflection characteristics substantially the same as, or simular to that of the film surface. In the second type light measuring system, two photoelectric elements may be used for the diaphragm and the shutter control respectively, with the first one for the diaphragm control receiving the object light on or behind the pentagonal prism, or at some other suitable position, via the reflex mirror at the viewing position thereof, while the second one for the shutter control receiving the light via the focal plane shutter member and/or the film surface as explained above. Alternatively, a single photoelectric element may be used for both the diaphragm and the shutter control with the reflex mirror being made at least partially semi-transparent so that the photoelectric element facing directly or indirectly (e.g. by way of a light reflection member) to the focal plane shutter and the film may receive the object light through the semitransparent portion of the reflex mirror while the latter is at the viewing position.

Returning now to the discussion of the present invention, although both types of light measuring systems are available for the present invention, the second type is preferable in view of the fact that the focal plane light reflection type, i.e. second type, is not affected by the unsteadiness of the diaphragm blades upon and/or shortly after the diaphragm aperture determination due to sudden abutment of the diaphragm stopping member with the diaphragm driving or operating member, because all the light impinging on the film through the diaphragm aperture during the exposure is taken into account. In other words, with the second type, the actuation of the reflex mirror followed by the shutter operation need not be delayed until the diaphragm aperture is stabilized. Further, in the second type, time for the storage of the light representative signal is unnecessary.

Whether the two element or the single element light measuring system is employed, the light from the object is detected in the second type through different light paths for the diaphragm control and for the shutter control. Therefore, the intensity of the light from an object of the same brightness differs at the light receiving surface of the photoelectric element, relying on the time when the light is measured.

According to one embodiment of the present invention, the output of the light measuring device is compensated in accordance with the mode of the light measurement so that the same result is obtained for the same object brightness.

The above and other objects and features of the invention will appear more fully hereinafter from a consideration of the following description taken in connection with the accompanying drawing wherein one example is illustrated by way of example.

DETAILED DESCRIPTION OF A PREFERRED EMBODIMENT

Figure 1:
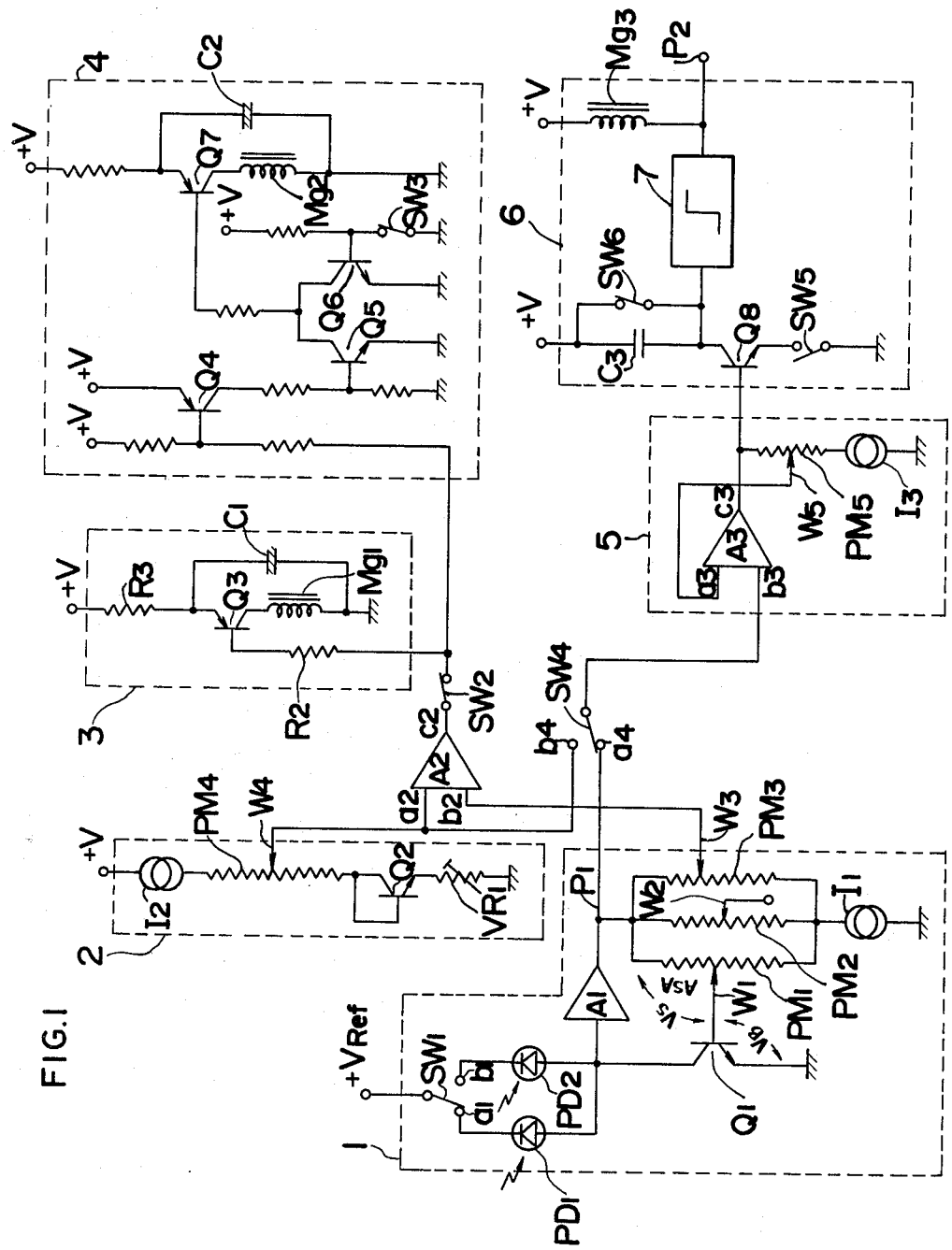
FIG. 1 is a diagram of an exposure control circuitry according to an embodiment of the present invention.

With reference to FIG. 1, the circuitry of this embodiment generally comprises light responsive circuit 1 wherein a voltage proportional to the logarithm of the intensity of a light incident on a photoelectric element PD1 or PD2 is obtained and adjusted or shifted in accordance with a set film sensitivity to generate at its output a light representative signal corresponding to a shutter speed suitable for the measured light, the set film sensitivity and the full open diaphragm aperture. The circuitry further comprises shutter signal circuit 2 generating an output commensurate with a manually set shutter speed, the output of the above two circuits being connected respectively to one of a pair of input terminals a2 and b2 of comparison circuit A2. The outputs of the two circuits 1 and 2 are also alternatively connectable through change over switch SW2 to level shift circuit 5, which in turn has its output connected with shutter control circuit 6. The shutter control circuit 6 controls timing of shutter closure in accordance with a time integration of a current corresponding to the output of light responsive circuit 1. The output of comparison circuit A2 is connected through switch SW2, which is opened for the diaphragm priority automatic shutter control photograph mode, to first electromagnet control ciruit 3 for retaining the diaphragm blades at a desired position, as well as to second electromagnet control circuit 4 for actuating a mirror driving mechanism which will be explained later with reference to FIG. 2.

Light responsive circuit 1 includes a pair of photodiodes PD1 and PD2 as the photoelectric elements. One of the photodiodes PD1 is disposed, for example, in the vicinity of a view finder eyepiece behind a pentagonal prism, to receive the object light through a camera objective and a diaphragm aperture when the camera is at the viewing condition and during the time while a diaphragm aperture is being determined. The second photodiode PD2 is disposed within the camera body to receive the light reflected from the light sensitive surface of a film and/or a light reflective surface of a focal plane shutter member covering the film. The cathodes of photodiodes PD1 and PD2 are respectively connected with terminals a1 and b1 which are to be alternatively selected by switch SW1 such that terminal a1 is selected normally and the switch SW1 is changed over to b1 in conjunction with the mirror movement from the viewing to the retracted photography position thereof. Transistor Q1, having its collector connected with both anodes of photodiodes PD1 and PD2, serves as a logarithmic compression transistor generating across its base-emitter a voltage proportional to the logarithm of a photoelectric current generated by the photodiode PD1 or PD2. DC amplifier A1 with high input impedance has its input terminal connected with the collector of transistor Q1. Potentiometer PM1 is connected at its one end with the ouput terminal of amplifier A1 and has a slider or movable contact W1 positionable in accordance with a manual film sensitivity setting. The slider W1 is connected to the base of transistor Q1. The output of the amplifier A1 is fed back to its input through potentiometer PM1 and transistor Q1 so that the collector potential of the transistor Q1 is maintained constant. If reference voltage source +VRef to which the common terminal of switch SW1 is connected, has the same voltage as the collector potential of transistor Q1, a short circuit current will be obtained from the photodiodes PD1 and PD2. This is favorable in that the short circuit current of a photodiode presents high linearity over a wide range of light intensity incident on the photodiode. Potentiometer PM2 includes a slider W2 which is moved in accordance with a diaphragm aperture value presetting operation by means of preset ring 16 (see FIG. 2) so that information of the preset diaphragm aperture value may be incorporated in the light representative signal from the transistor Q1. Thus at the slider W2 is generated a signal representative of a shutter speed or an exposure time depending on the preset diaphragm aperture value as well as the object brightness detected by the photodiode PD1 and the set film sensitivity. The slide W2 is connected to a shutter speed indicating device for the indication of such a shutter speed. Potentiometer PM3 serves to compensate for the difference in the outputs of the photodiodes PD1 and PD2 due to the difference of the optical systems through which object light is introduced to the photodiodes.

Constant current source I1 supplies constant current to potentiometers PM1, PM2 and PM3. Thus, between the slider W1 and the ground level will occur a voltage VT representing the sum of the base-emitter voltage VB of transistor Q1, that is proportional to the logarithm of the light intensity or illumination at the light receiving surface of photodiode PD1 and PD2, and the voltage between the slider W1 and line P1 corresponds to a set film sensitivity.

In shutter signal circuit 2, constant current source I2 supplies constant current to potentiometer PM4 which in turn includes a slider W4 movable in accordance with a manual shutter speed setting. Diode-connected transistor Q2 serves as a temperature compensator for the logarithmic compression transistor Q1 and logarithmic expansion transistor Q8 described later. Variable resistor VR1 may be adjusted for the adjustment of the output level at the slider W4.

Comparison circuit or voltage comparator A2 compares the voltages applied to its pair of input terminals a2 and b2. One of the terminals a2 is connected with the slider W4 of potentiometer PM4 to be supplied with a signal representative of the manually set shutter speed, while the other terminal b2 is the slider W3 of potentiometer PM3 to be supplied with the output signal of the light responsive circuit 1, with compensation being incorporated in the output signal. Comparison circuit A2 inverts its output potential form "high" to "low" when the potential at terminal b2 becomes lower than the potential at terminal a2.

In first electromagnet control circuit 3, capacitor C1 is charged through resistor R3 prior to camera operation. Electromagnet MG1 includes a permanent magnet in, or on, its core, or otherwise the core itself is composed of a permanent magnet material so that an armature for the electromagnet Mg1 is held or restrained under the magnetic force of the permanent magnet before the operation of the electromagnet, and allowed to move under a biasing force of a spring when the electromagnetic coil is energized to offset and weaken the magnetic force of the permanent magnet.

Transistor Q3 has its base connected to the output of comparison circuit A2 through switch SW2 so that when the output level of the comparison circuit switches from "high" to "low", base current for the transistor Q3 runs through resistor R2 and the switch SW2 so that the transistor Q3 becomes conductive to discharge capacitor C1 through the electromagnetic coil of electromagnet Mg1, thereby allowing the movement of the armature to stop or interrupt the diaphragm operation. Thus, a diaphragm aperture is determined in dependance on the timing of the energization of electromagnet Mg1.

Transistors Q4 and Q5 in second electromagnet control circuit 4 are made conductive in response to the inversion of the output level of comparison circuit A2, while transistor Q6 parallelly connected with transistor Q5 is made conductive when switch SW3 connected to its base is opened with a diaphragm driving lever (20) in the camera body reaching its terminal position, i.e. with a diaphragm driving operation completed. The structure and operation of the driving lever 20 will be described below with reference to FIGS. 2 to 4. The circuit composed of electromagnet Mg2, capacitor C2, transistor Q7 and resistor R4 is substantially the same in construction and function as the first electromagnet control circuit 3. When either of transistors Q5 and Q6 is made conductive, transistor Q7 becomes conductive to energize electromagnet Mg2 with the discharge current of capacitor C2, thereby initiating the retirement of the reflex mirror from its viewing to photographic, i.e. out-of-light-path position.

Level shift circuit 5 is adapted to shift, by a given amount of voltage, the level of the signal applied to the input terminal of operational amplifier A3, and generates the shifted signal at the output terminal C3 of the circuit. This shift of voltage is caused by the voltage drop across the resistor between the slider W5 of potentiometer PM5 and the output C3. The potentiometer PM5 is connected between the output C3 and constant current 13 which supplies a constant current to the potentiometer PM5. Switch SW4 serves to select the shutter control mode. When terminal a4 is selected, the shutter speed is controlled in accordance with the light reflected by the focal plane shutter member and/or film. When terminal b4 is selected, the shutter speed is controlled in accordance with the manual setting of potentiometer PM4.

Finally, in shutter control circuit 6, transistor Q8 functions as a logarithmic expansion transistor generating a collector current proportional to the antilogarithm of the output voltage of the level shift circuit which voltage is applied between the base-emitter of the transistor Q8. Switch S5 connected to the emitter of transistor Q8 is adapted to be closed with initiation of shutter opening operation to connect the transistor in the circuit. Capacitor C3 is charged with the collector current of transistor Q8 to time integrate the current. Switch SW6 is connected across capacitor C3 to discharge the latter. The switch SW6 is opened in conjunction with shutter release operation. Block 7 is a switching circuit or threshold means which inverts it output to deenergize electromagnet Mg3 and initiate shutter closing operation when the capacitor C3 has been charged to a given level.

The operation of the above explained circuitry will now be described. In case of the shutter speed priority and automatic shutter speed compensation exposure control mode, switch Sw4 is connected to terminal a4, with a voltage signal commensurate with a set shutter speed being applied to the input terminal a2 of comparison circuit A2. For this exposure mode, the diaphragm aperture preset member should be set to the minimum diaphragm aperture, i.e. maximum f-number position. With these conditions, if a shutter release member is manually operated to initiate an exposure sequence, diaphragm driving lever 20 is released from its restraint to initiate the driving operation, for example the stopping-down of the diaphragm blades so that the diaphragm aperture varies gradually with the intensity of the light incident on the photodiode PD1 changing therewith, followed by the change of the potential at slider W3. In the present invention the diaphragm aperture is stopped-down from its full aperture in response to the shutter release operation. Therefore, the potential at slider W3 decrease as the diaphragm aperture is stopped down. When the potential at the slider W3 reaches the level at input terminal a2 of comparison circuit A2, first and second electromagnet control circuits 3 and 4 are actuated to interrupt the diaphragm operation for the diaphragm aperture determination and together therewith to actuate the mirror. Since the operations of diaphragm aperture determinating operation and the mirror actuation are effected separately by using the electromagnets Mg1 and Mg2, no loss of time will occur with the sequence from the shutter release operation to the initiation of exposure being performed in the minimum time interval.

Figure 2:
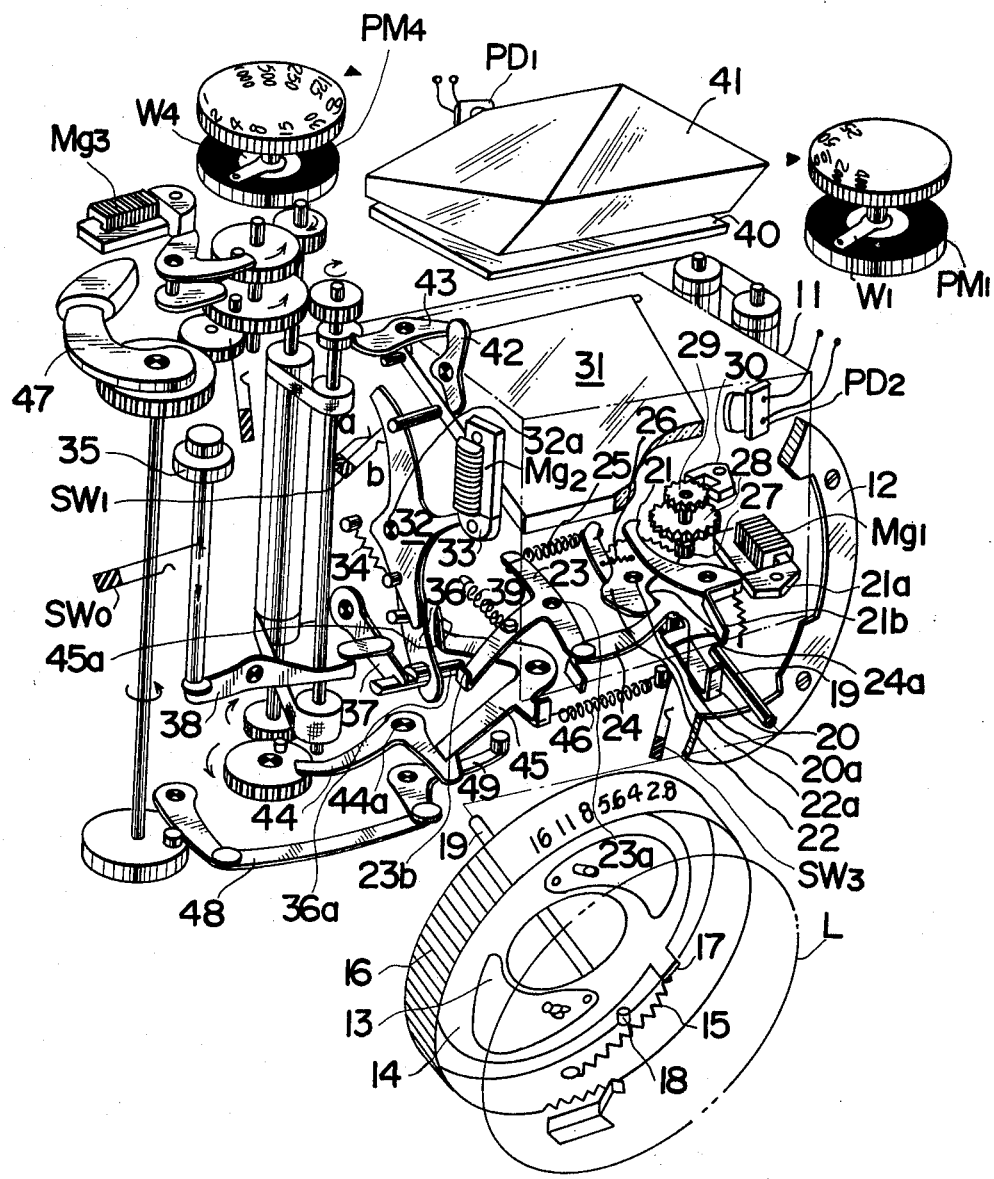
FIG. 2 is a perspective view of a camera mechanism associated with the circuitry of FIG. 1.

When switch SW1 is changed over to terminal b1 in response to the mirror operation, photodiode PD2 is connected in the light responsive circuit. As photodiodes PD1 and PD2 are disposed at different positions as mentioned before, the light intensity incident on them differs even if the light traverses a diaphragm aperture of the same size. Further the output levels at line P1 derived from the photodiode PD1 and PD2 respectively, differ from one another for the same object brightness measured through the same size of the diaphgram aperture. The circuitry of FIG. 2 is adapted for the case where the photodiode PD1 receives higher intensity of light than the diode PD2, with the output voltage at line P1 is shifted by the voltage drop between the line P1 and the slider W3 before the light representative signal is applied to the input terminal b2 of comparison circuit for the diaphragm determination. It should be noted that the photodiode PD1 is used for the automatic diaphragm determination. Thus, the slider W3 is adjusted such that the light representative signal derived from the photodiode PD1 and obtained at the slider terminal W3 will be identical with the signal obtained directly from the line P1 with the photodiode PD2 being selected.

Upon completion of the mirror movement, a shutter opening operation is initiated with switch SW5 being closed in synchronism therewith, so that capacitor C3 starts to be charged with the collector current of transistor Q8. The shutter control circuit 6 has substantially the same construction as that employed in known storage type exposure time control systems, although the control system of the present embodiment does not need the storage device. In the embodiment of the present invention, the object light traversing the objective and reflected from the focal plane shutter member and/or the film during the exposure is detected by photodiode PD2, the output of which is logarithmically compressed and derived through line P1 with information of film sensitivity being incorporated therein, and the signal from the line P1 is transmitted, through level shift circuit 5 after some adjustment, to the base-emitter of logarithmic expansion transistor Q8. The level shift circuit 5 is adapted for compensation of the deviations of the characteristics of the logarithmic expansion transistor Q8 and the capacitance of the capacitor C3 actually used.

In case of the diaphragm aperture priority automatic shutter control mode, the mode selection switch SW2 is opened, by the electromagnet Mg1 so that the interruption of the diaphragm operation will not occur even when the output of comparison circuit A2 is inverted during the diaphragm operation. Accordingly, the diaphragm is stopped-down until it is stopped mechanically at a manually preset value. Subsequently, the diaphragm member continues its movement to the terminal position where it opens switch SW2 and energizes electromagnet Mg2 to initiate the reflex mirror operation or retirement followed by the actuation of the shutter mechanism which is controlled by the control circuit 6 in the same manner as is done in the shutter priority automatic diaphragm mode.

In case both the diaphragm and shutter are desired to be controlled in accordance with manual setting, switch SW4 is connected to terminal b4, with switch SW2 being opened as in the diaphragm priority case. Then, the shutter speed is controlled in accordance with the output of the shutter signal circuit 2.

Figure 3:
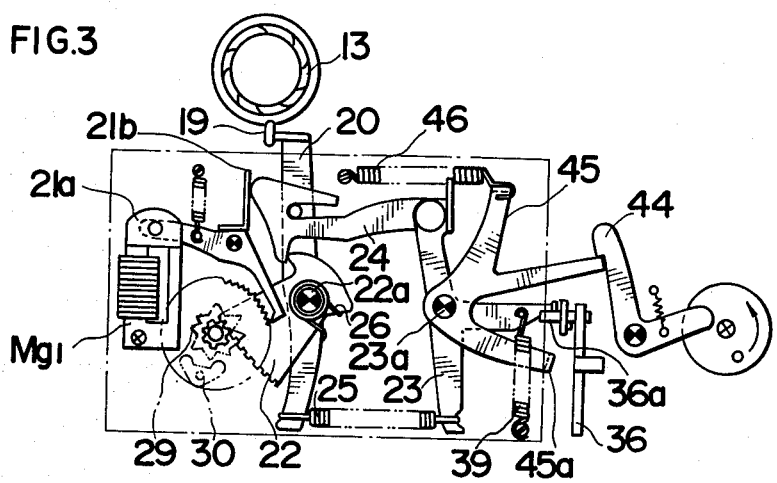
FIG. 3 is a diagrammatic view of the diaphragm control mechanism in the camera mechanism of FIG. 2, showing the relative positions of the main components of the diaphragm control mechanism at the cocking position.
Figure 4:
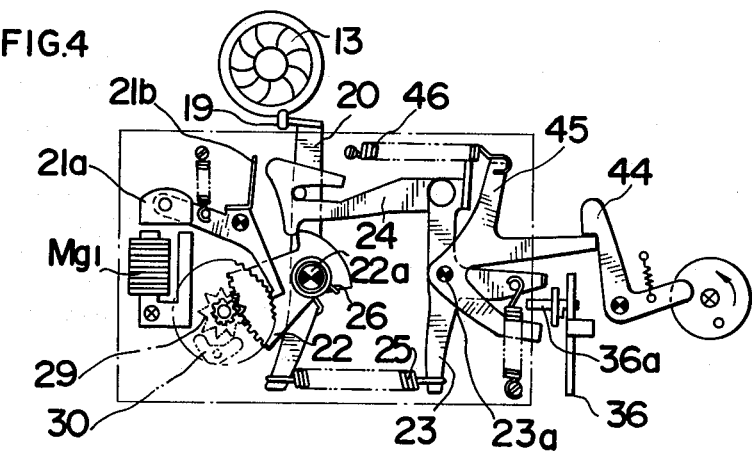
FIG. 4 is a same view as that of FIG. 3 but at an operating condition.

With reference to FIG. 2, and appropriate reference to FIGS. 3 and 4, in an embodiment of the mechanism for the exposure control, interchangeable camera objective or photographic lens L including an automatic diaphragm stopping-down mechanism is detachably mounted on lens mount flange 12 on mirror box 11 of the camera body. The photographic lens 1 comprises diaphragm ring 14 adapted to open and close the diaphragm aperture defined by diaphragm blades 13 (only two blades are shown in the Figure for the simplicity of illustration), spring 15 for urging the diaphragm ring 14 in the direction to stop down the diaphragm aperture, and preset ring 16 for presetting a diaphragm aperture value prior to a camera operation. Upon camera release operation, diaphragm ring 14 is permitted to move under the force of spring 15 until lug 17 fixed on the diaphragm ring 14 abuts against pin 18 fixed on preset ring 16 to determine the diaphragm aperture to a preset value.

Diaphragm operating pin 19 extending from diaphragm ring 14 toward the camera body is coupled with diaphragm lever 20, which is provided in the camera body, upon attachment of the photographic lens to the camera body. The diaphragm operating pin 19, when coupled, is engaged by the diaphragm lever 20 to be brought, against the force of spring 15, to the position where the diaphragm aperture is fully opened. The diaphragm aperture is maintained at the full open position with the camera being cocked, and stopped-down by the operation of diaphragm ring 14 under the force of spring 15 upon shutter release operation. Hence, the diaphragm preset ring 16 should be set to the minimum diaphragm aperture position, i.e. the maximum f-number position when the diaphragm aperture is automatically controlled as is the case with the present invention.

Diaphragm aperture control mechanism for determining an operational position of the diaphragm lever and accordingly the diaphragm aperture, is arranged at the bottom of camera mirror box 11 and comprises engaging lever 21 for the restraint of the diaphragm lever 20 in response to inversion of the magnetic field of electromagnet Mg1, a mechanism for ensuring the restraint, and a mechanism including means for transmitting the movement of the diaphragm lever 20 to a member to be engaged by the engaging member, in amplified relationship in the stroke so that the diaphragm lever 20 may be restrained in position with high precision.

Diaphragm lever 20 is pivoted on stud 22a along with sector gear 23 and forms a loop-shaped moving structure in cooperation with lever 23 pivotally mounted on another stud 23a, link lever 24 is interconnected with lever 23 at one end of the latter, spring 25 is tensioned between the other end of lever 23 and diaphragm lever 20, and pin 20a of diaphragm lever 20 engages in the U-shaped slot or recess of lever 24 such that the pin 20a is allowed to move in a direction relative to, and independently of, the lever 24. Diaphragm lever 20 is interlocked with sector gear 22 by means of spring 26 in one directional engagement relationship such that the movement of the diaphragm lever 20 from its cocked to operational position, i.e. clockwise rotation of the lever accompanies the sector gear 22 but the latter gear 22 is dis-engaged when the diaphragm lever 20 returns to the cocked position.

Sector gear 22 is interconnected through pinion 27 with ratchet wheel 28 which is integrally and coaxially mounted with the pinion 27, to rotate the ratchet wheel 28. The interconnection between the sector gear 22 and ratchet wheel 28 is such that the rotational displacement or angular stroke of the ratchet wheel 28 is enlarged or amplified as compared with the operating stroke of the diaphragm operating pin 19. Ankle 30 is provided in opposing relation to escape wheel 29 coaxial and integral with ratchet wheel 28, thereby moderating the movement of diaphragm lever 20. Thus, it is ensured that the engaging lever 21 opposing ratchet wheel 28 is brought into engagement with the teeth of the ratchet wheel 28 at a desired time so that the diaphragm aperture determining operation may be highly responsive to the actuation of the first electromagnet Mg1 of FIG. 1.

Mechanism for driving reflex mirror 31 is arranged at one side wall of mirror box 11. Reflex mirror 31 is lifted or swung up from the 45° viewing position to the horizontal photographic position by the rotation of mirror driving lever 32 under the force of spring 34, with the mirror driving lever 32, which has mounted thereon an armature cooperating with electromagnet Mg2, being released from the retainment of the electromagnet Mg2 due to inversion of the magnetic field thereof in response to the conduction of transistor Q7 of FIG. 2.

Prior to the depression of release button 35, mirror driving lever 32 is also restrained in addition to electromagnet Mg2, by intermediate lever 36, which is coaxially mounted with the mirror driving lever 32, with intermediate lever 36 being locked by release lever 37. Upon depression of release button 35, release lever 37 is actuated via relay lever 38 release intermediate lever 36 thereby permitting the clockwise rotation of lever 23 under the biasing force of spring 39 as well as releasing the restraint of mirror driving lever 32 by the intermediate lever 36. Therefore, when the electromagnetic coil is energized to offset the magnetic force of a permanent magnet of the electromagnet MG2, mirror driving lever 32 starts to rotate thereby lifting reflex mirror 31. Simultaneously, the rotation of mirror driving lever 31 causes change-over of switch SW1 from the terminal a1 to the terminal b2.

Referring again to the diaphragm aperture determining operation, when intermediate lever 36 is allowed its movement by the upward movement of the restraining portion of release lever 37 in response to the depression of shutter release button 35, lever 23 rotates clockwise and this rotational movement of lever 23 is transmitted through link lever 24 and spring 25 to diaphragm lever 20, which also rotates clockwise. Then, diaphragm operating pin 19 in the lens L follows the diaphragm lever 20 under the force of spring 15 to stop-down the diaphragm aperture. Sector gear 22, interconnected by spring with diaphragm lever 20, also rotates clockwise about shaft or pin 22a thereby rotating ratchet wheel 28 counterclockwise through pinion 27, with the rotation of ratchet wheel 28 being moderated by the combination of ankle 30 and ratchet wheel 29. Therefore, the diaphragm aperture is stopped-down at a low speed, while object light traversing the diaphragm aperture being stopped-down is introduced through reflex mirror 31, condenser lens 40, pentagonal prism 41 and the other known optical elements to photoelectric element PD1. Accordingly the output of the light responsive circuit 1 applied to the input terminal b2 of comparison circuit A2 decreases with the stopping-down of the diaphragm aperture until the aperture become a suitable size where the output of comparison circuit A2 is inverted to a low level, thereby actuating electromagnet Mg1 through transistor Q3 so that engaging lever 21, being released from the attraction of its armature 21a, rotates clockwise to engage the teeth of ratchet wheel 28 and stop the movement of the latter. Upon this engagement, the loop-shaped moving structure stops its movement to stop diaphragm operating pin 19, thereby determining the diaphragm aperture of the interchangeable lens. Simultaneously with the actuation of the first electromagnet Mg1, the second magnet Mg2 is operated to initiate the reflex mirror movement as mentioned above. If diaphragm lever 20 travels to the possible terminal end without actuation of the first magnet Mg1, then switch SW3 is opened, thereby actuating electromagnet Mg2 to cause the mirror movement to the upper horizontal picture taking position. Thus, when the diaphragm aperture has been determined and reflex mirror 31 has been lifted up to its horizontal position, leading curtain restraining lever 43 is actuated by way of mirror-up-detection lever 42 so that the leading shutter curtain is released from the restraint at the cocked position and starts to travel to initiate an exposure. Upon completion of the reflex mirror movement to its horizontal position, the object light reflected by the leading shutter curtain and/or the exposed film surface is received by photodiode PD2, with a current commensurate with the output of the photoelectric element PD2 flows with the actuation of the leading shutter curtain, into capacitor C3 to charge the latter. When the charged voltage of the capacitor C3 reaches a given level, electromagnet Mg3 is actuated to cause the trailing shutter curtain to start its travel thereby terminating the exposure. Upon completion of the travel of the trailing shutter curtain, preventing lever 44 is actuated to cause return movement of the diaphragm aperture determining mechanism and the mirror moving mechanism. When preventing lever 44 rotates clockwise about shaft or supporting pin 44a, return lever 45 rotates under the force of spring 46 to push pin 36a carried by intermediate lever 36 thereby swinging down reflex mirror 31. Simultaneously pin 36a pushes lever 23 at its end 23b and rotates it counterclockwise. The rotational movement of the lever 23 is transmitted through spring 25 to diaphragm lever 20, so that the latter is rotated to fully open the diaphragm aperture. In the terminal stage of the rotation of the diaphragm lever 20, end portion 24a of link lever 24 abuts against and pushes resilient strip 21b of engaging lever 21 to rotate the latter lever counterclockwise thereby releasing the restraint of ratchet 28 as well as causing armature 21a to abut against the core of electromagnet Mg1 under the spring force of the deformed resilient strip. Simultaneously, sector gear 22 returns to its initial position under the force of spring 26. Return lever 45 is charged by winding-up operation of wind-up lever 47 through levers 48 and 49.

We claim:

1. An automatic exposure control system for a single lens reflex camera including a camera body and a film, comprising:

means manually operable for shutter release;

diaphragm means for defining a diaphragm aperture;

diaphragm driving means for driving said diaphragm means to change the diaphragm aperture in response to manual release operation;

photoelectric means for receiving light from an object to be photographed through the diaphragm aperture;

light measuring means including said photoelectric means for generating a first signal as a function of the light received by said photoelectric means, said first signal being dependent on the diaphragm aperture;

means for manually setting a shutter speed;

means for generating a second signal as a function of the manually set shutter speed;

means for timing the shutter closure;

selection means for selectively connecting said means for timing to said light measuring means and to said means for generating a second signal;

means for setting a film sensitivity;

means for generating a third signal as a function of the set film sensitivity;

comparison means for comparing said first, second and third signals and generating a fourth signal with said first and third signals reaching a given relationship with said second signal;

first electromagnetic means for arresting said diaphragm driving means in response to the generation of said fourth signal;

a reflex mirror means movable between a viewing and a photographic position;

second electromagnetic means for actuating, in response to the generation of said fourth signal, said reflex mirror means from said viewing to said photographic position, and including a first switch member actuatable with said diaphragm driving means travelling to a terminal position, an electromagnetic member for actuating said mirror, a first switch means for actuating said electromagnetic member in response to said fourth signal, and second switch means for actuating said electromagnetic member in response to the actuation of said first switch member;

shutter means actuated, with said reflex mirror reaching said photographic position, to commence exposure and including a focal plane shutter member with light reflection characteristics; and said photoelectric means further includes a first photoelectric member disposed in said camera body to receive the light from the object through the diaphragm aperture with said reflex mirror at said viewing position, and a second photoelectric member disposed in the camera body to receive light from the object through the diaphragm aperture by reflection from said focal plane shutter member and/or film.

2. The automatic exposure control system as claimed in claim 1 further comprising a second switch member alternately connected between said comparison means and said first and second electromagnetic means for interrupting the supply of said fourth signal to the latter two means, in response to a manual operation of said second switch member to select diaphragm priority or shutter speed priority mode of operation.

3. The automatic exposure control system as claimed in claim 1 wherein said light measuring means includes a logarithmic compression means such that said first signal is proportional to the logarithm of the intensity of the light received by said photoelectric means, said means for generating a third signal being coupled with said logarithmic compression circuit to generate a fifth signal representative of a shutter speed suitable for the measured light and said set film sensitivity as a result of said third signal and said first signal, and said means for timing includes a logarithmic expansion means for generating a sixth signal proportional to the anti-logarithm of an input applied thereto, said input being dependent on said fifth signal.

4. The automatic exposure control system as claimed in claim 3 further comprising a level shift circuit connected between said selection means and said means for timing.

5. The automatic exposure control system as claimed in claim 1 wherein said comparison means includes a pair of input terminals, one input being connected to said means for generating a second signal, and the other input being supplied with said fifth signal.

6. The automatic exposure control system as in claim 1 wherein said light measuring means includes a pair of output terminals, one of said output terminals being connected with said comparison means for diaphragm aperture control with said first photoelectric member, and the other of said output terminals being connectable to said means for timing the shutter closure by said second photoelectric member, said light measuring means further including means for differentiating the output at said two output terminals to compensate for the difference in light incident on said first and second photoelectric members from the same object.

* * * * *